June 12, 1934.  L. S. MACDONALD  1,962,250
METHOD OF PREPARING OUTERSOLES
Filed Dec. 18, 1931
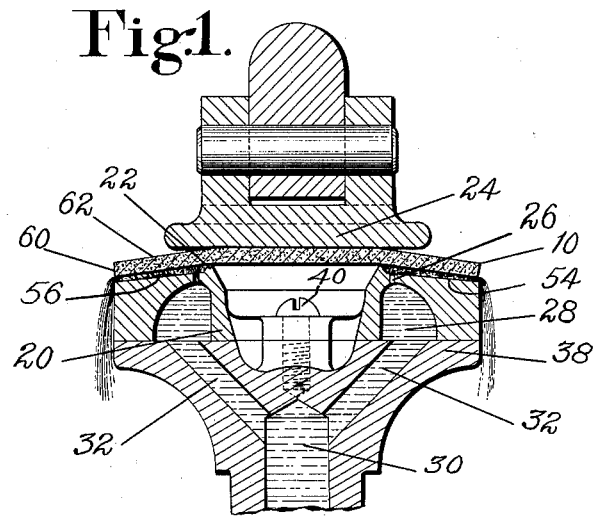

Patented June 12, 1934

1,962,250

UNITED STATES PATENT OFFICE 1,962,250

METHOD OF PREPARING OUTERSOLES

Lester S. Macdonald, Beverly, Mass., assignor to United Shoe Machinery Corporation, Paterson, N. J., a corporation of New Jersey Application December 18, 1931, Serial No. 581,913

19 Claims. (Cl. 12—146)

This invention relates to methods of preparing outersoles bearing a dried coating of adhesive by reviving the adhesive and is concerned with the application of solvent for this purpose. The invention has special application to the manufacture of shoes of the type in which the soles are permanently attached to the shoes by means of cement such as pyroxylin cement.

In work of this type it is common practice to apply cement to the flesh surface of an outersole, frequently in a marginal stripe, to allow this cement coating to dry, and then, just before the sole is to be applied to the shoe, to revive the coating of cement by the application of a suitable solvent. This practice results from the fact that cements of the type commonly employed, mostly pyroxylin cements, are very quick drying, and it seems impracticable to apply the cement to a sole immediately before the application of the sole to a shoe because of this quick drying property and the likelihood that the coating of cement would not be in uniform condition when applied to the shoe. Furthermore, such an arrangement either requires the operator of the sole attaching machine to interrupt his work in order to apply the cement himself or else requires the use of another operator, only a fraction of whose time will be needed to apply the cement and to hand the soles to the first operator.

It is a common practice to put on the solvent by means of a brush. This is not satisfactory with many kinds of cement and many kinds of solvent because of the uneven application of the solvent, the certainty that one part will dry out before the other, and the actual removal or at least displacement of a portion of the cement which often results from the dragging of the brush over the cemented surfaces. It is well understood that the edges and tread surfaces of soles of this kind must be kept clean of cement and that they should not be wet with solvent because of the danger of staining the sole resulting from the likelihood of the mingling of some cement with the solvent and its consequent deposit upon the surface of the sole which is to be kept clean. It is therefore an object of this invention to provide an improved method of preparing outersoles in the practice of which a sole conditioning fluid or solvent will be applied more uniformly and quickly than heretofore, and with less danger of soiling the edges and tread surfaces of the soles.

From one viewpoint my method of preparing an unattached outersole, to which there has been applied a coating of cement which has been allowed to dry, for attachment to a lasted shoe by means of said cement, is characterized by the step of reviving the dry cement by applying solvent substantially simultaneously upon all portions of the cemented area of the sole without applying the solvent to the uncemented middle area of the sole. Advantageously this simultaneous application of solvent may be effected by flowing the solvent on the portions of the cemented area of the sole to be activated.

As illustrated, the sole is supported without masking its previously cemented marginal area and with its cemented flesh surface positioned to drain without danger of coating the uncemented surfaces, and the conditioning fluid or solvent is applied substantially simultaneously to all portions of the marginal cemented area without applying the solvent to the middle area of the flesh surface. Being positioned thus, the excess solvent drains from the sole without coating the tread surface or the edges of the sole and is caught in a suitable receptacle for reuse. At the same time, it is possible to apply solvent in sufficient quantity to the sole so that a slight excess will be deposited upon the cement coating which, after the sole has been applied to the shoe, revives the dry coating of cement upon the shoe and brings it into condition for perfect union with the cement upon the sole.

It is desirable to avoid applying solvent to the mid portion of the forepart of the sole within the marginal stripe of cement because this would result in a substantial waste of solvent and would involve the possibility that the drying out of the solvent in the shoe to which the sole has been attached would be delayed by reason of this excess of solvent in the mid portion where it is not needed. Another characteristic of the invention resides in the protection of the uncemented area within the stripe of cement by masking it and applying the conditioning liquid or solvent to the unmasked area of the face of the sole. As illustrated, the sole to which there has been applied a marginal stripe of cement is positioned flesh side downwardly upon a support which effectively masks the uncemented mid portion of the sole, and the solvent is applied to the unmasked area contiguous to the boundary of the masked area, as by flowing it on. Also, as illustrated, the flowing of the solvent is effected by directing a stream of solvent against the uncovered margin of the flesh side of the sole.

From still another viewpoint the invention resides in supporting the sole in such a position that it will drain without soiling the uncemented portions of the sole and directing a stream of solvent against a cemented margin thereof in a direction pointing away from the uncemented area within the margin to revive the cement without coating with solvent the uncemented area or soiling portions of the sole which are to be exposed in the finished shoe. Such a directing of the stream of solvent tends in itself to avoid wetting the edges and tread surface of the sole and permits the unused solvent to fall away from the sole after it has coated the desired portions thereof.

These and other features of the invention will be best understood from a consideration of the following specification taken in connection with the accompanying drawing, in which Fig. 1 is a transverse section through a sole clamped upon a suitable support having provision for flowing solvent upon the margins of the sole while protecting the central portion thereof;

Fig. 2 is a vertical longitudinal section through the sole and its support;

Fig. 3 is a plan view of the support showing in dotted lines the outline of a sole as it would be positioned thereon;

Fig. 4 shows the flesh surface of a sole which has been wet with solvent; and

Fig. 5 is a transverse vertical section through the shank portion of the sole when being treated.

My novel method will be described by showing how it may be carried out with the assistance of a suitable apparatus. This apparatus is not claimed herein as it, at least in part, forms the subject-matter of an application Serial No. 616,908 filed June 13, 1932, in my name, and is shown wholly to facilitate a description of the method. It will be understood that the method may be carried out by means of this or any other suitable device. It is common practice to limit the application of the cement upon the flesh surface of a sole, which is to be attached to a shoe permanently by means of cement, to a narrow stripe around the margin of the flesh surface of the sole such as the sole 10, illustrated in Fig. 4, and commonly this stripe will start at 12 near the heel breast line and continue around the toe end of the shoe terminating at a similar point on the opposite side of the sole. At the shank portion of the sole the two stripes frequently will cover the whole of the shank portion and may in some cases overlap. In the central portion of the forepart of the sole is a dry, island-like space 14 which is uncoated with cement and on which it is not necessary to apply solvent.

Accordingly, in carrying out my method, this dry space 14 is protected from the application of solvent and conveniently the protection may be afforded by a support 20 having a ridge 22 in the form of an elongated oval, as shown in Fig. 3, whereby the support also acts as a mask protecting the mid-portion of the forepart of the sole. Provision is made for clamping the sole upon the support 20 and specifically upon the ridge 22 by means of a presser member 24.

The solvent is flowed upon the cemented margin of the sole by directing streams of fluid solvent through a large number of small holes 26 in the support 20 interconnected by a passage 28 to which solvent is supplied in any desired manner, as, for example, by pumping it through a supply duct 30 having a plurality of lateral passages 32, 34 and 36. These latter passages are formed in a block 38 secured in tight relation to the support 20 by attaching means such as a screw 40. The shank and heel portion of a sole extends in a direction angularly related to the median line of the forepart and this direction will be reversed for lefts and rights. Accordingly, the apparatus may be constructed to apply solvent to either left or right soles, and to this end a hollow tube 42 has a central ridge 44 on which the sole rests and is clamped by an extension 46 of the presser member 24. This tube 42 has a series of holes 48 along either side of the ridge 44 through which streams of solvent may be directed outwardly, from a point adjacent to the uncemented middle portions of the sole, toward the cemented margin thereof. Lateral deflectors or shelves 49 are provided upon the tube 42 to assist in directing the flow of solvent upon the cement coated surface of the shank portion of the sole. The hollow tube 42 is supported upon a swingable spigot-like block 50 which, however, has a passage 52 always in communication with the passage 36. This block 50 has a ridge 22' completing the oval of the ridge 22. It will be noted that, in the forepart of the sole where the margin to be coated is of substantial width, the support 20 has ledges 54 and 56 underlying these margins and causing the solvent to flow along in contact therewith as it emerges from the openings 26.

In the application of solvent in accordance with my novel method, a sole 10 which may be, and often is, a molded sole, will be placed in an inverted position with its flesh side facing downwardly upon the support 20 without masking the marginal cemented area and will be pressed against the ridges 22, 22' and 44 thereon by bringing down the presser member 24. Solvent flowing through the apertures 26 and 48 beneath the sole is directed outwardly in a large number of gentle streams, operating to coat substantially simultaneously all of the cemented area of the sole which it is desired to activate and any excess of solvent will fall away from the sole draining back into a suitable receptacle (not shown) where it may be captured for re-use. There will be no disturbance of the cement by this method of treatment and inasmuch as the solvent is applied substantially simultaneously to the cement coated surface, all portions of it which are to be activated will be in the same condition and ready to form a uniform and perfect union with the upper of a lasted shoe. There is little danger of coating the edge 60 or tread surface 62 of the sole, partly because the sole is in inverted position where the solvent will readily fall away from it and, second, because the streams of the solvent are directed outwardly from a midpoint toward the margin of the sole. No solvent will be wasted by applying it to portions of the sole such as the island-like space 14 and any deleterious results which might come from coating this space are also avoided.

Having thus described my invention, what I claim as new and desire to secure by Letters Patent of the United States is:

1. The method of preparing an outersole, to which there has been applied a coating of cement which has been allowed to dry, for permanent attachment to a lasted shoe by means of said cement, which includes the step of reviving the dry cement by flowing solvent substantially simultaneously upon all portions of the cemented area of the sole.

2. The method of preparing an outersole, to which there has been applied a marginal coating of cement which has been allowed to dry, for permanent attachment to a lasted shoe by means of said cement, which includes the steps of protecting the uncemented mid portion of the sole, and reviving the dry cement by flowing solvent substantially simultaneously upon all portions of the cemented area of the sole.

3. The method of preparing an outersole, to which has been applied a coating of cement which has been allowed to dry, for permanent attachment to a lasted shoe by means of said coating of cement, which consists in supporting a sole in inverted position with the cemented side down, and substantially simultaneously flowing solvent upon substantially all of the cemented area of the then underside of the sole.

4. The method of preparing an outersole, to the margin of which there has been applied a coating of cement which has been allowed to dry, for permanent attachment to a lasted shoe by means of said cement, which consists in supporting the sole in such a position that it will drain without soiling uncemented portions of the sole, and directing a stream of solvent against a cemented margin of the sole in a direction pointing away from the uncemented area within the margin thereby to activate the cement without coating with solvent the uncemented area of the sole.

5. The method of preparing an outersole, to the margin of which there has been applied a coating of cement which has been allowed to dry, for permanent attachment to a lasted shoe by means of said cement, which consists in supporting the sole in a position to drain without soiling the uncemented tread surface of the sole, and directing a stream of solvent against the cement-coated surface of the sole outwardly toward the edge of the sole to revive the cement without soiling portions of the sole which are exposed in the finished shoe.

6. The method of preparing an outersole, on the marginal portion of the flesh surface of which is a dry stripe of cement, which consists in holding the sole with the flesh surface downward, and directing a stream of solvent from a position beneath the sole outwardly toward the edge into contact with the stripe of cement, allowing any excess of solvent to fall away from the sole.

7. The method of preparing an outersole, to which there has been applied a coating of cement which has been allowed to dry, for permanent attachment to a lasted shoe by means of said cement, which comprises protecting a portion of the flesh side of the sole, and flowing solvent on the unprotected cemented portion to revive the cement.

8. The method of preparing an outersole, the margin of which bears a stripe of dry cement, for permanent attachment to a lasted shoe by means of said cement, which consists in protecting the portion of the sole within said stripe, and directing a stream of solvent upon the marginal stripe of cement to revive it.

9. The method of preparing an outersole, the margin of which bears a stripe of dry cement, for permanent attachment to a lasted shoe by means of said cement, which consists in positioning the sole on a support, covering the uncemented portion of the forepart thereof, and flowing solvent upon the stripe of cement to revive it.

10. The method of preparing an outersole, the margin of which bears a stripe of dry cement, for permanent attachment to a lasted shoe by means of said cement, which consists in positioning the sole in inverted position upon a support, covering the uncemented mid-portion of the flesh side of the sole, and flowing solvent against the marginal under surface of the sole to revive the cement.

11. The method of preparing an outersole, the margin of which bears a stripe of dry cement, for permanent attachment to a lasted shoe by means of said cement, which comprises positioning an inverted sole on a support, clamping the sole thus positioned, and flowing solvent upon the cemented portion of the sole, allowing the excess of solvent to fall away from the sole without contacting with the tread surface thereof.

12. The method of preparing an outersole, the margin of which bears a stripe of dry cement, for permanent attachment to a lasted shoe by means of said cement, which consists in simultaneously supporting a sole and shielding the uncemented portion thereof, and then directing a stream of solvent against the cemented surface to revive the cement.

13. That improvement in methods of preparing unattached soles for attachment to the uppers of shoes, which consists in supporting a sole face down with the marginal area of its under face exposed, flowing a sole-conditioning fluid substantially simultaneously on all portions of said area, and excluding such fluid from the middle area of said face.

14. That improvement in methods of preparing unattached, previously marginally cemented soles for attachment to the uppers of lasted shoes, which consists in supporting a sole cemented face down with only the previously cemented marginal area projecting beyond the support, and applying a sole-conditioning fluid to all portions of the previously cemented marginal area of the attaching face of the sole substantially simultaneously while excluding such fluid from the middle area of said face.

15. That improvement in methods of preparing unattached soles for attachment to the uppers of shoes, which consists in supporting a sole attaching face down with the marginal area of its under face exposed, and applying a stream of conditioning fluid to all portions of said area substantially simultaneously without applying such fluid to the middle area of said face.

16. That improvement in methods of preparing unattached soles for attachment to the uppers of shoes, which consists in supporting a sole attaching face down with the marginal area of its under face exposed, applying a conditioning fluid in a stream to deliver more than the desired quantity to all portions of said area substantially simultaneously, and excluding such fluid from the middle area of said face.

17. That improvement in methods of preparing molded, unattached soles for attachment to uppers of shoes, which consists in masking an area of an attaching face of a molded sole smaller than the sole, and applying a stream of conditioning fluid to an area of said face not so masked.

18. That improvement in methods of preparing molded, unattached soles for attachment to uppers of shoes, which consists in masking an area of the attaching face of a molded sole other than the marginal area of said face without masking the marginal area, applying a conditioning fluid in a stream to some or all of the unmasked area of said face, and thereafter unmasking the area first mentioned.

19. That improvement in methods of preparing soles having a dried marginal stripe of cement on the flesh side for attachment to uppers of shoes, which consists in arranging a sole cemented face down, masking the whole uncemented middle area of the under face of the sole, applying a conditioning fluid to a portion of the cemented area of the under face not masked, and thereafter unmasking the middle area.

LESTER S. MACDONALD.